(12) United States Patent
Usui

(10) Patent No.: US 8,438,746 B2
(45) Date of Patent: May 14, 2013

(54) COORDINATE MEASURING MACHINE

(75) Inventor: Tomohiro Usui, Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 249 days.

(21) Appl. No.: 13/017,746

(22) Filed: Jan. 31, 2011

(65) Prior Publication Data

US 2011/0192044 A1 Aug. 11, 2011

(30) Foreign Application Priority Data

Feb. 5, 2010 (JP) .................................. 2010-023814

(51) Int. Cl.
*G01B 5/008* (2006.01)

(52) U.S. Cl.
USPC ............................................................ 33/503

(58) Field of Classification Search ...................... 33/503
See application file for complete search history.

(56) References Cited

U.S. PATENT DOCUMENTS

| | | | | |
|---|---|---|---|---|
| 4,333,238 A | * | 6/1982 | McMurtry | ........................ 33/504 |
| 5,029,398 A | * | 7/1991 | Ertl | .................................. 33/503 |
| 5,471,406 A | * | 11/1995 | Breyer et al. | ................. 702/168 |
| 5,657,549 A | * | 8/1997 | Shen et al. | ........................ 33/503 |
| 6,158,136 A | * | 12/2000 | Gotz et al. | ........................ 33/503 |
| 7,752,766 B2 | * | 7/2010 | Ruck et al. | ....................... 33/503 |
| 7,779,553 B2 | * | 8/2010 | Jordil et al. | ...................... 33/558 |
| 2008/0083127 A1 | * | 4/2008 | McMurtry et al. | ............... 33/502 |
| 2008/0295349 A1 | | 12/2008 | Uhl et al. | |
| 2011/0056085 A1 | * | 3/2011 | Jordil | .............................. 33/503 |
| 2011/0232118 A1 | * | 9/2011 | Hon et al. | ........................ 33/559 |

FOREIGN PATENT DOCUMENTS

| | | |
|---|---|---|
| JP | A-2009-524032 | 6/2009 |
| WO | WO 2007/082779 A1 | 7/2007 |

OTHER PUBLICATIONS

Search Report issued in European Patent Application No. 11153301.4 dated May 25, 2011.

* cited by examiner

*Primary Examiner* — Christopher Fulton
(74) *Attorney, Agent, or Firm* — Oliff & Berridge, PLC

(57) ABSTRACT

A coordinate measuring machine includes: a probe for measuring an object; a movement mechanism for moving the probe; and a motion controller for controlling the movement mechanism. The motion controller includes: a current value detecting unit that detects a current value for moving the probe by the movement mechanism; and a load judging unit that judges a status of a load applied on the movement mechanism based on the current value detected by the current value detecting unit and a threshold that is set in accordance with a target speed for moving the probe by the movement mechanism. The target speed is in proportion to the threshold.

2 Claims, 7 Drawing Sheets

COORDINATE MEASURING MACHINE

The entire disclosure of Japanese Patent Application No. 2010-023814 filed Feb. 5, 2010 is expressly incorporated by reference herein.

BACKGROUND OF THE INVENTION

1. Field of the Invention

The present invention relates to a coordinate measuring machine.

2. Description of Related Art

A known coordinate measuring machine includes: a probe for measuring an object; a movement mechanism for moving the probe; and a controller for controlling the movement mechanism (see, for instance, Document 1: JP-T-2009-524032). The coordinate measuring machine is designed to stop the movement of the probe when the probe or the movement mechanism and the object collide with each other, for instance, on account of an operation error of a user while the probe is moved by the movement mechanism.

When the probe or the movement mechanism and the object collide with each other, a load applied on the movement mechanism increases, resulting in an increase in a current value for moving the probe by the movement mechanism. Thus, in order to judge the collision between the probe or the movement mechanism and the object, the coordinate measuring machine may be designed to judge the occurrence of the collision between the probe or the movement mechanism and the object when the current value exceeds a predetermined threshold.

However, when an acceleration of the movement of the probe by the movement mechanism is small (i.e. low speed), the current value is small. On the other hand, when the acceleration is large (i.e. high speed), the current value is large. Accordingly, with a constant threshold for judging the collision between the probe or the movement mechanism and the object, when the speed for moving the probe by the movement mechanism is slow, it takes nonnegligible time for the coordinate measuring machine to judge that the probe or the movement mechanism and the object collide with each other after the collision actually occurred.

The coordinate measuring machine disclosed in Document 1 detects a current value flowing to an electric motor for driving a movement mechanism including a column, horizontal support, horizontal feeder and coordinate measuring device, where the detected current value is compared with a stepwise threshold that is set in accordance with a target speed and acceleration for moving a probe head (probe) by the movement mechanism to judge the occurrence of the collision between the probe or the movement mechanism and the object. According to the above arrangement, it is possible for the coordinate measuring machine to speedily judge the occurrence of collision between the probe or the movement mechanism and the object as compared to an arrangement in which a constant threshold is used.

However, since the coordinate measuring machine disclosed in Document 1 sets the threshold in a stepwise manner in accordance with the target speed and the acceleration, an appropriate threshold cannot be set for the target speed and acceleration.

SUMMARY OF THE INVENTION

An object of the invention is to provide a coordinate measuring machine that is adapted to set an appropriate threshold for judging a collision between a probe or a movement mechanism and an object, so that an occurrence of the collision between the probe or the movement mechanism and the object can be rapidly judged.

A coordinate measuring machine according to an aspect of the invention includes: a probe for measuring an object; a movement mechanism for moving the probe; and a controller for controlling the movement mechanism, the controller including: a current value detecting unit that detects a current value for moving the probe by the movement mechanism; and a load judging unit that judges a status of a load applied on the movement mechanism based on the current value detected by the current value detecting unit and a threshold that is set in accordance with a target speed for moving the probe by the movement mechanism, in which the target speed is in proportion to the threshold.

According to the above aspect of the invention, since the target speed for moving the probe by the movement mechanism is in proportion to the threshold set by the load judging unit, when the target speed for moving the probe by the movement mechanism is small, the load judging unit sets the threshold at a small value; when the target speed is large, the load judging unit sets the threshold at a large value. Accordingly, the coordinate measuring machine can set an appropriate threshold for judging the collision between the probe or the movement mechanism and the object, so that the occurrence of the collision between the probe or the movement mechanism and the object can be rapidly judged.

In the above arrangement, the load judging unit preferably judges the status of the load applied on the movement mechanism based on a length of the time during which the current value detected by the current value detecting unit is kept larger than the threshold.

The current value detected by the current value detecting unit may exceed the threshold not only when the probe or the movement mechanism and the object collide with each other but also when the speed for moving the probe by the movement mechanism is increased.

According to the above arrangement, since the load judging unit judges the status of the load applied to the movement mechanism based on the length of the duration in which the current value detected by the current value detecting unit is larger than the threshold, erroneous judgment of the status of the load applied on the movement mechanism can be avoided when the speed for moving the probe by the movement mechanism is increased.

DETAILED DESCRIPTION OF PREFERRED EMBODIMENT(S)

Figure 1:
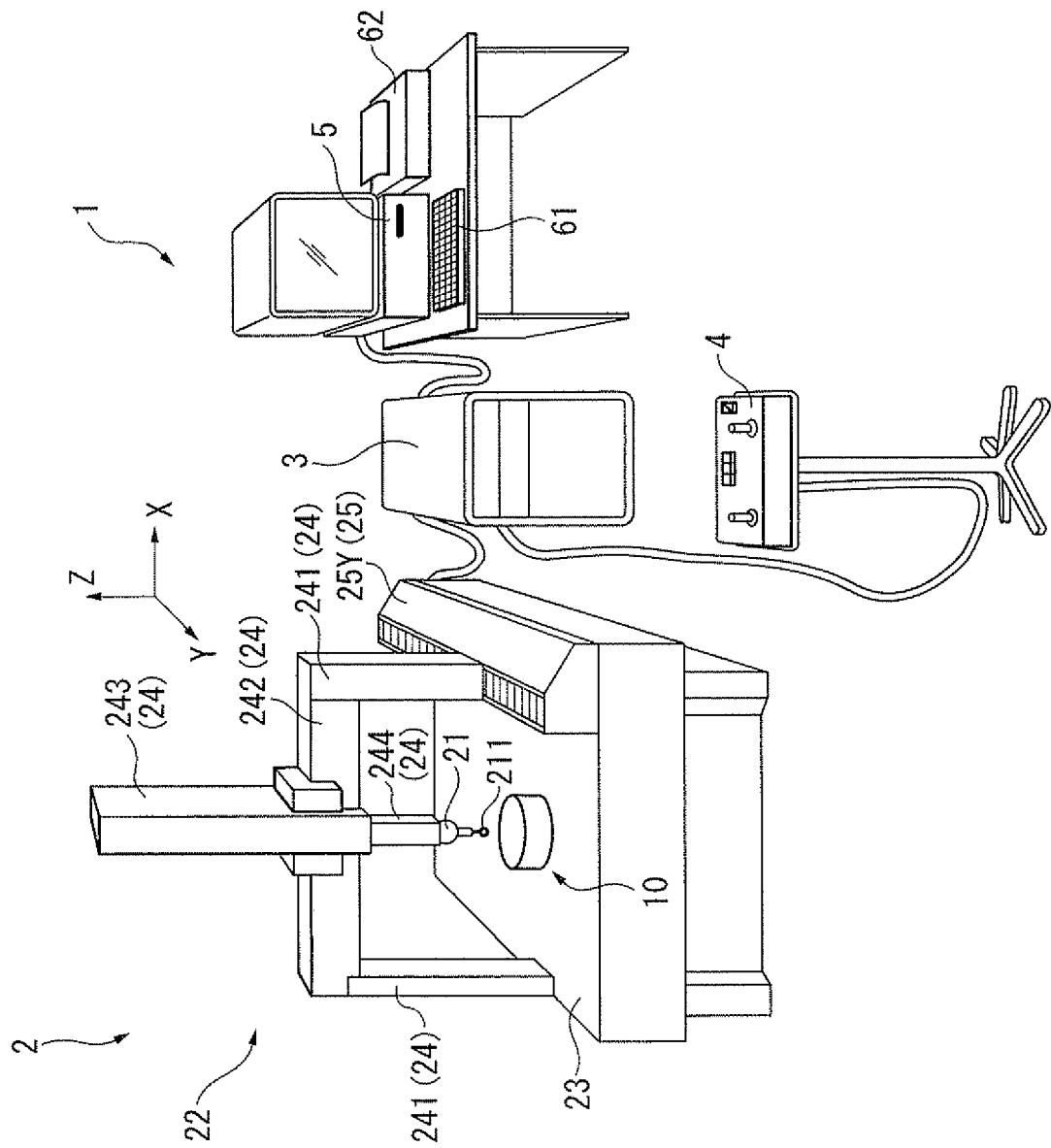
FIG. 1 is an illustration schematically showing an overall arrangement of a coordinate measuring machine according to an exemplary embodiment of the invention.
Figure 2:
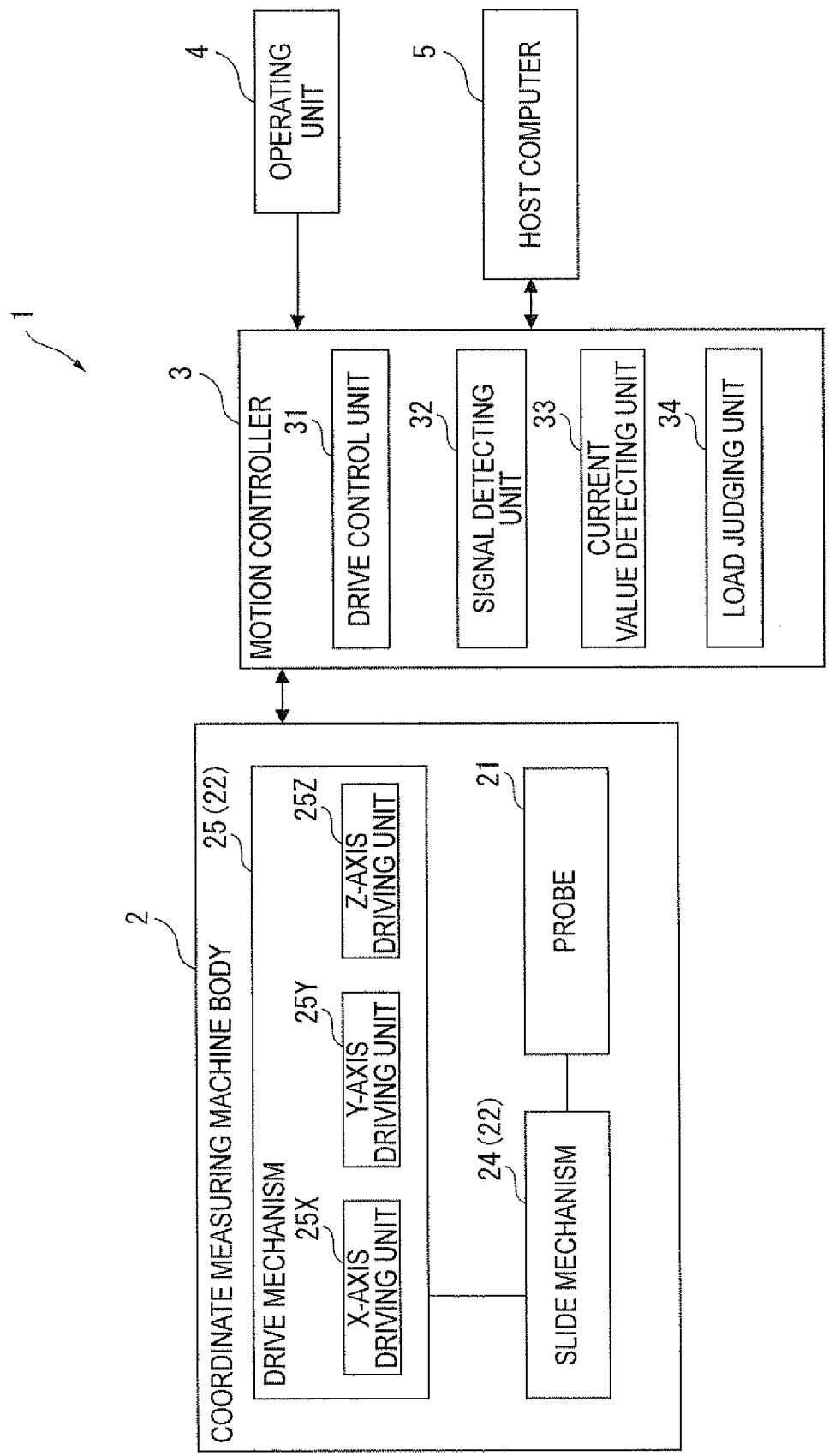
FIG. 2 is a block diagram schematically showing an arrangement of the coordinate measuring machine according to the exemplary embodiment.

An exemplary embodiment of the invention will be described below with reference to the attached drawings.
Arrangement of Coordinate Measuring Machine FIG. 1 is an illustration schematically showing an overall arrangement of a coordinate measuring machine 1 according to an exemplary embodiment of the invention. FIG. 2 is a block diagram schematically showing an arrangement of the coordinate measuring machine 1. Incidentally, an upward direction in FIG. 1 will be denoted as +Z-axis direction, and two axes orthogonal to the Z-axis will be denoted as X-axis and Y-axis.

As shown in FIG. 1, the coordinate measuring machine 1 includes: a coordinate measuring machine body 2; a motion controller 3 that controls a drive of the coordinate measuring machine body 2; an operating unit 4 that manually operates the coordinate measuring machine body 2 through commands inputted by a control lever and the like; a host computer 5 that issues a predetermined command to the motion controller 3 and executes an arithmetic processing such as shape analysis of a workpiece 10 (an object to be measured) disposed on the coordinate measuring machine body 2; and an input unit 61 and an output unit 62 connected to the host computer 5. Incidentally, the input unit 61 inputs measurement conditions and the like of the coordinate measuring machine 1 into the host computer 5. The output unit 62 outputs measurement results of the coordinate measuring machine 1.

The coordinate measuring machine body 2 includes: a probe 21 having a stylus 211 to be in contact with a surface of the workpiece 10 at an end thereof (in −Z-axis direction); a movement mechanism 22 that holds a base end (in +Z-axis direction) of the probe 21 and moves the probe 21; and a measurement stage 23 on which the movement mechanism 22 is provided upright.

The movement mechanism 22 includes: a slide mechanism 24 that holds the base end of the probe 21 while allowing a slide movement of the probe 21; and a drive mechanism 25 that drives the slide mechanism 24 to move the probe 21.

The slide mechanism 24 includes: two columns 241 respectively extending from either end (in X-axis direction) of the measurement stage 23 in +Z-axis direction, the columns 241 being slidable along Y-axis direction; a beam 242 supported by the columns 241, the beam 242 extending in X-axis direction; a slider 243 in the form of a cylinder extending in Z-axis direction, the slider 243 being slidable on the beam 242 in X-axis direction; and a ram 244 inserted into the slider 243, the ram 244 being slidable in the slider 243 in Z-axis direction.

As shown in FIGS. 1 and 2, the drive mechanism 25 includes: a Y-axis driving unit 25Y that supports one of the columns 241 located in +X-axis direction so that the columns 241 are slidable along Y-axis direction; an X-axis driving unit 25X (not shown in FIG. 1) that slides the slider 243 on the beam 242 in X-axis direction; and a Z-axis driving unit 25Z (not shown in FIG. 1) that slides the ram 244 in the slider 243 in Z-axis direction. Though not illustrated, the drive mechanism 25 is provided with a plurality of sensors respectively for detecting a displacement of the slide mechanism 24 in respective axis-directions, each of the plurality of sensors outputting a signal in accordance with the displacement of the slide mechanism 24.

As shown in FIG. 2, the motion controller 3 (controller) is provided with: a drive control unit 31 that controls the drive mechanism 25 in accordance with the command from the operating unit 4 or the host computer 5; and a signal detecting unit 32 that detects the signal outputted by the sensors provided on the drive mechanism 25.

The signal detecting unit 32 detects the signal outputted by the respective sensors to detect the displacement of the slide mechanism 24. The displacement of the slide mechanism 24 detected by the signal detecting unit 32 is outputted to the host computer 5. Incidentally, the displacement of the slide mechanism 24 is adjusted to indicate the displacement of a gravity center of the stylus 211.

Further, the motion controller 3 is configured to execute a load judgment process before conducting a predetermined process such as stopping the movement of the probe 21 when the probe 21 or the slide mechanism 24 and the workpiece 10 collide with each other on account of an operation error of a user and the like.

Specifically, the motion controller 3 includes a current value detecting unit 33 and a load judging unit 34.

The current value detecting unit 33 detects a current value for moving the probe 21 by the movement mechanism 22.

The load judging unit 34 judges the load applied on the movement mechanism 22 based on the current value detected by the current value detecting unit 33 and the threshold that is set in accordance with the target speed for moving the probe 21 by the movement mechanism 22. The target speed for moving the probe 21 by the movement mechanism 22 is calculated by the motion controller 3 based on the command from the operating unit 4 or the host computer 5.

The host computer 5 includes a CPU (Central Processing Unit), a memory and the like. The host computer 5 outputs a predetermined command to the motion controller 3 to control the coordinate measuring machine body 2 to move the stylus 211 along a surface of the workpiece 10 by the movement mechanism 22, thereby measuring the profile of the workpiece 10.

Load Judgment Process of Coordinate Measuring Machine

Figure 3:
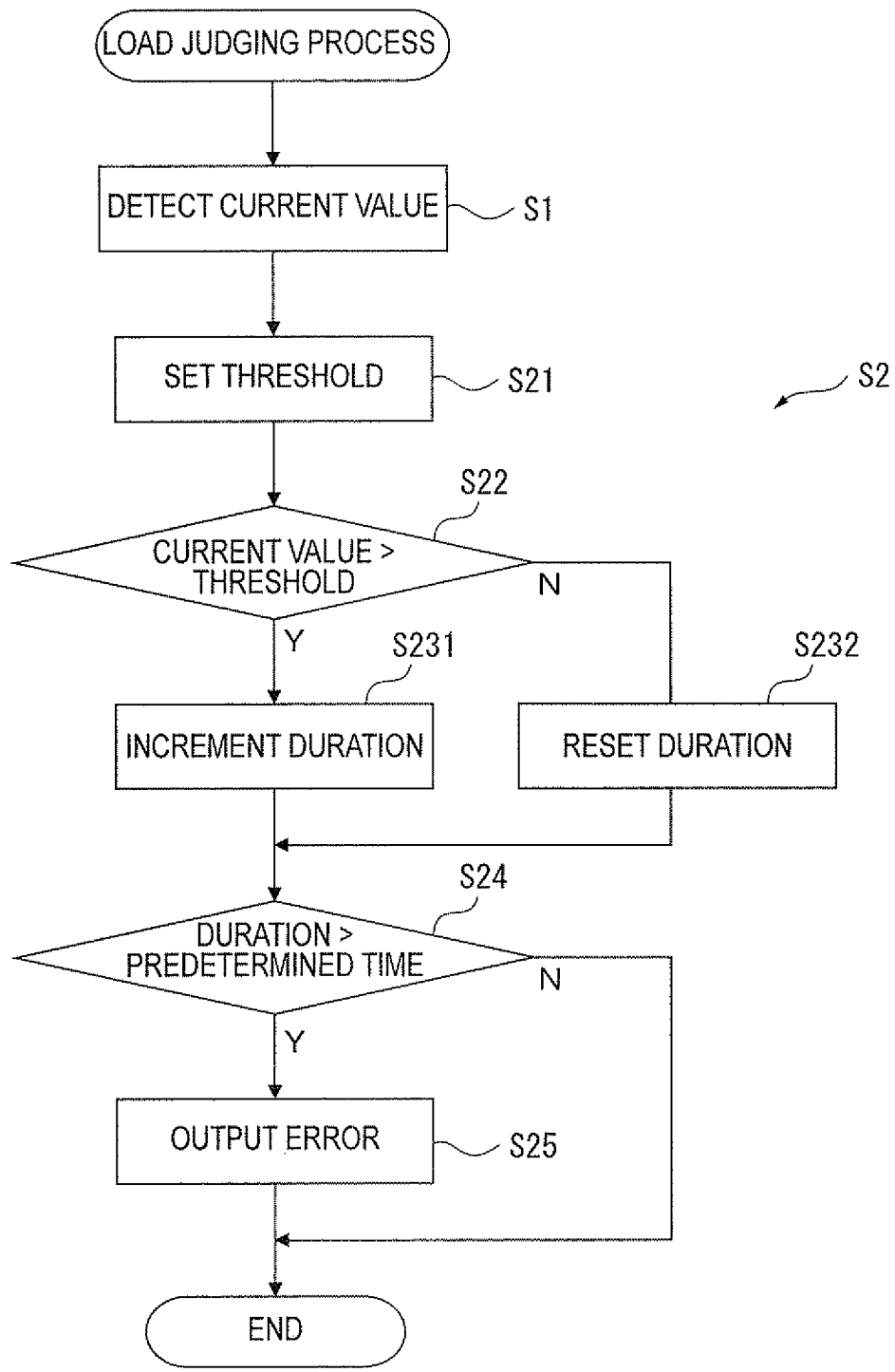
FIG. 3 is a flowchart showing a load judgment process of the coordinate measuring machine according to the exemplary embodiment.

FIG. 3 is a flowchart showing a load judgment process of the coordinate measuring machine 1.

As shown in FIG. 3, the motion controller 3 executes the following steps S1 to S25 when the load judgment process is executed. Incidentally, the load judgment process is repeated at a predetermined interval.

Initially, the current value detecting unit 33 detects a current value for moving the probe 21 by the movement mechanism 22 (S1: current value detecting step).

Figure 4:
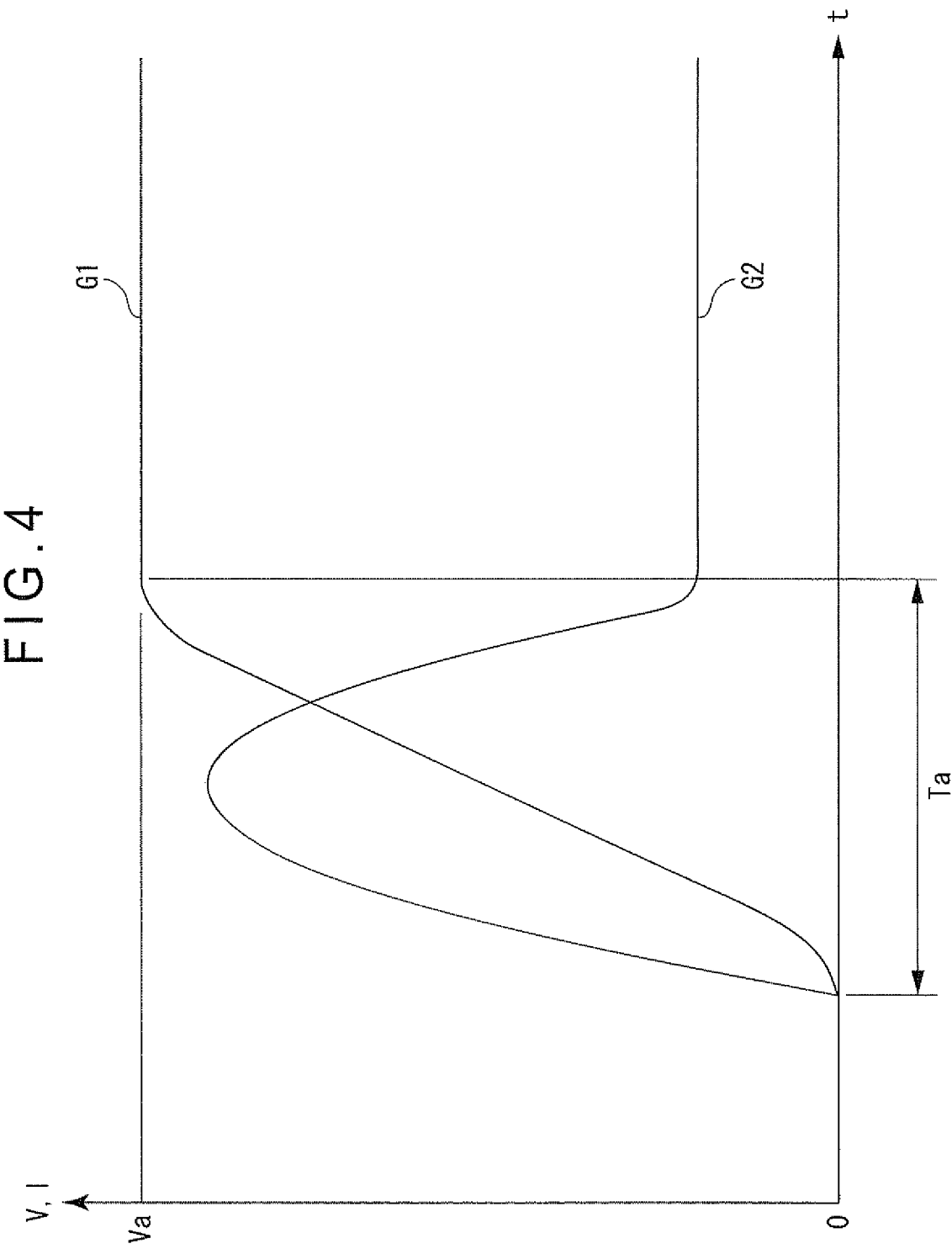
FIG. 4 is a graph showing a relationship between a speed for moving the probe by a movement mechanism and a current value detected by a current value detecting unit in the exemplary embodiment.

FIG. 4 is a graph showing a relationship between a speed V for moving the probe 21 by the movement mechanism 22 and a current value I detected by the current value detecting unit 33. Incidentally, the speed V and the current value I are plotted in a vertical axis and a time t is plotted in a horizontal axis. Further, in FIG. 4, the change in the speed V accelerating from 0 to Va is shown in a graph G1 (a time required for acceleration of the speed V (from 0 to Va) will be referred to as an acceleration time Ta hereinafter) and the change in the current value I that is changed in accordance with the speed V is shown in a graph G2. Va represents a target speed for moving the probe 21 by the movement mechanism 22.

As shown in FIG. 4, when the change in the speed V is large (i.e. when the acceleration is large), the current value I becomes large; when the change in the speed V is small (i.e. when the acceleration is small), the current value I becomes small. The current value I becomes constant when the speed V becomes unchanged (this state will be referred to as a steady state hereinafter).

When the current value I is detected during the current value detecting step S1, the load judging unit 34 executes the following steps S21 to S25 and judges a condition of the load applied on the movement mechanism 22 based on the current value I detected during the current value detecting step S1 and the threshold that is set in accordance with the target speed Va for moving the probe 21 by the movement mechanism 22 (S2: load judging step).

In the load judging step S2, the load judging unit 34 initially sets the threshold based on the target value Va for moving the probe 21 by the movement mechanism 22 (S21: threshold setting step).

Figure 5:
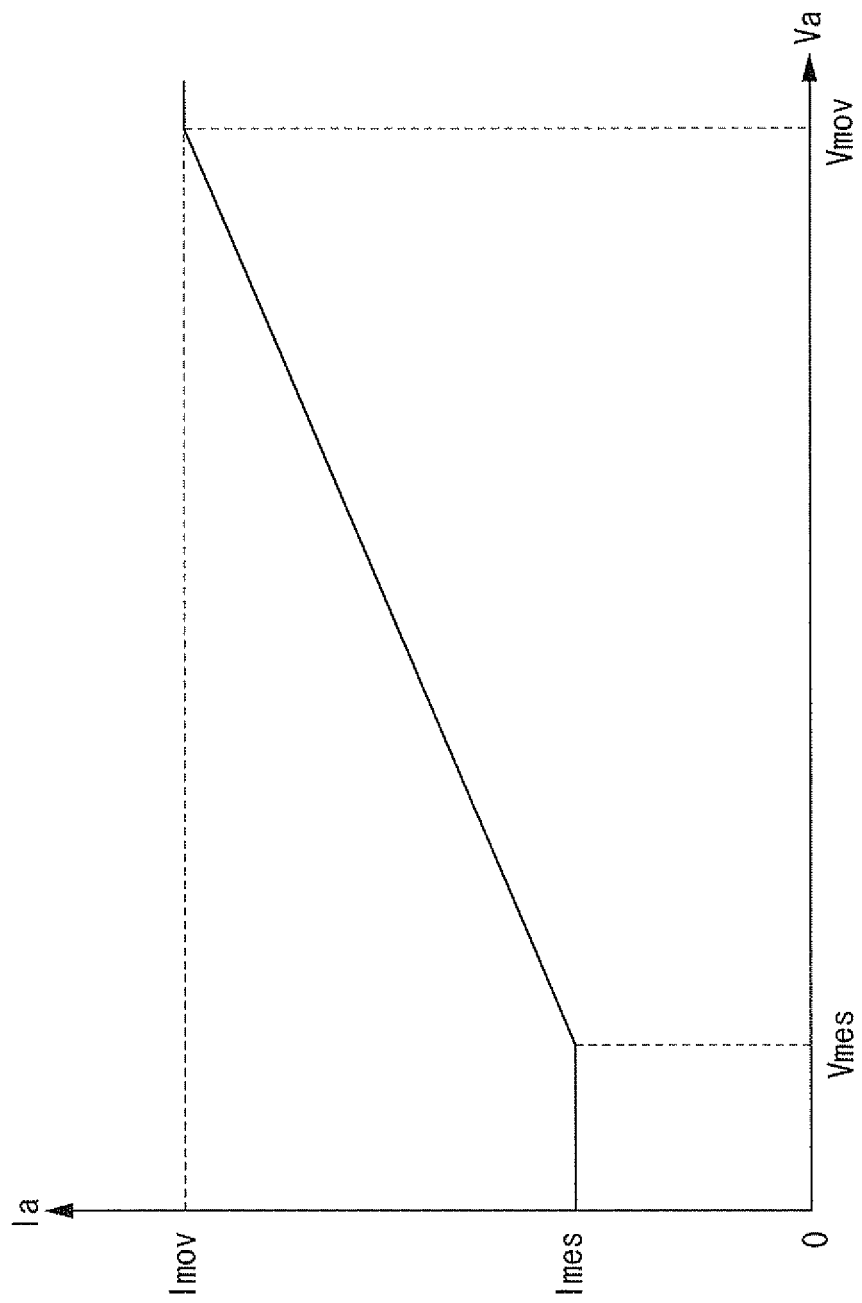
FIG. 5 is a graph showing a relationship between a target speed for moving the probe by the movement mechanism and a threshold set by a load judging unit in the exemplary embodiment.

FIG. 5 is a graph showing a relationship between the target speed Va for moving the probe 21 by the movement mechanism 22 and threshold Ia set by the load judging unit 34. Incidentally, the threshold Ia is plotted in a vertical axis and the target speed Va is plotted in a horizontal axis in FIG. 5.

As shown in FIG. 5, the threshold Ia set by the load judging unit 34 is in proportion to the target speed Va for moving the probe 21 by the movement mechanism 22. Incidentally, in this exemplary embodiment, the speed for moving the probe 21 by the movement mechanism 22 in measuring the workpiece 10 by the probe 21 is defined as a minimum speed Vmes for moving the probe 21 by the movement mechanism 22, and the speed for moving the probe 21 without measuring the workpiece 10 is defined as a maximum speed Vmov for moving the probe 21 by the movement mechanism 22.

The load judging unit 34 sets the threshold Ia for the target speed Va according to the following formula (I), in which Imes is a threshold when the target speed Va is at the minimum speed Vmes and Imov is a threshold when the target speed Va is at the maximum speed Vmov.

It should be noted that Va=Vmes when the target speed Va is the minimum speed Vmes or less (i.e. Va≦Vmes) and Va=Vmov when the target speed Va is the maximum speed Vmov or more (i.e. Va≧Vmov).

$$Ia = \frac{Imov - Imes}{Vmov - Vmes} \times (Va - Vmes) + Imes \quad (1)$$

Figure 6:
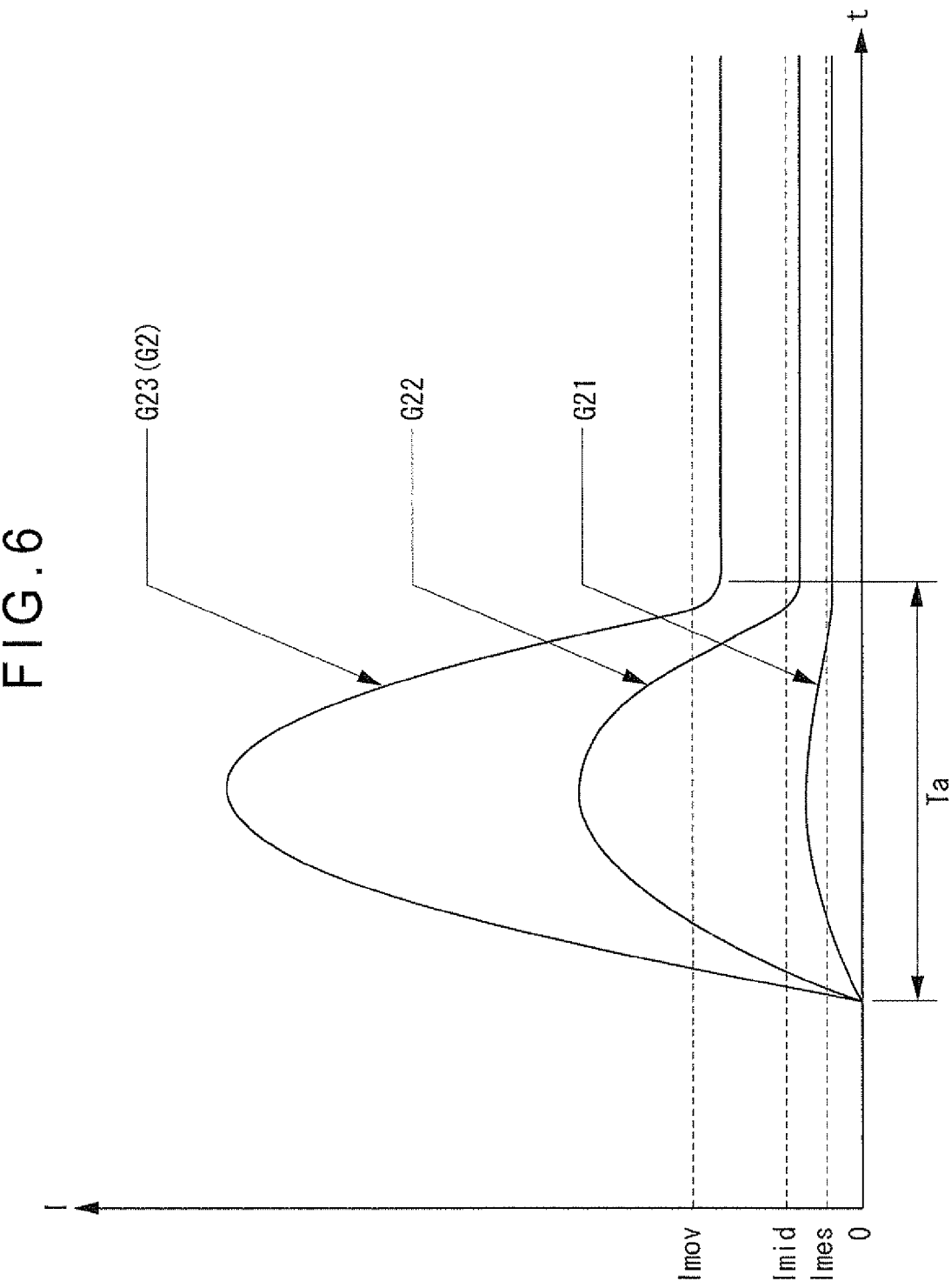
FIG. 6 is a graph showing a relationship between conditions of the current values for minimum, middle and maximum target speeds and the threshold set by the load judging unit in the exemplary embodiment.

FIG. 6 is a graph showing a relationship between: conditions of the current values I for the minimum speed Vmes, middle speed Vmid and maximum value Vmov of the target speed Va; and the threshold Ia set by the load judging unit 34. Incidentally, the current value I is plotted in a vertical axis and a time t is plotted in a horizontal axis in FIG. 6. Further, in FIG. 6, the change in the current value I in accordance with the change in the speed V is shown in graphs G21 to G23 in a manner similar to FIG. 4. Specifically, the graph G21 is a graph showing a change in the current value I when the target speed Va is the minimum speed Vmes; the graph G22 is a graph showing a change in the current value I when the target speed Va is the middle speed Vmid between the minimum speed Vmes and the maximum value Vmov, which shows a change in the current value I when the target speed Va is the maximum value Vmov. Incidentally, the graph G23 is the same graph as the graph G2 in FIG. 4.

In this exemplary embodiment, the load judging unit 34 sets the threshold Imes when the target speed Va is at the minimum speed Vmes and the threshold Imov when the target speed Va is at the maximum value Vmov at a value equal to approximately 120% of the current value I in the steady state for each of the target speeds Va as shown in FIG. 6.

Accordingly, the load judging unit 34 sets the threshold Imid when the target speed Va is the middle speed Vmid at a value equal to approximately 120% of the current value I in the steady state for the target speed Va Vmid according to the above-described formula (1).

When the threshold is set in the threshold setting step S21, the load judging unit 34 compares the current value I detected in the current value detecting step S1 and the threshold set in the threshold setting step S21 (S22: current value judging step).

When the current value I is larger than the threshold, the load judging unit 34 increments the duration (S231: duration increment step). When the current value I is smaller than the threshold, the load judging unit 34 resets the duration (S232: duration reset step). Incidentally, the duration means the length of the time during which the current value I is kept larger than the threshold. The duration is a variable (initial value=0) stored in a memory of the motion controller 3.

When the duration is updated in the duration increment step S231 or in the duration reset step S232, the load judging unit 34 compares the updated duration and a predetermined time Tb (S24: duration judging step). When the duration is longer than the predetermined time Tb, the load judging unit 34 outputs an error (S25: error output step). When the duration is shorter than the predetermined time Tb, the load judging unit 34 terminates the load judging process without outputting an error. In other words, the load judging unit 34 judges the status of the load applied to the movement mechanism 22 based on the duration.

Figure 7:
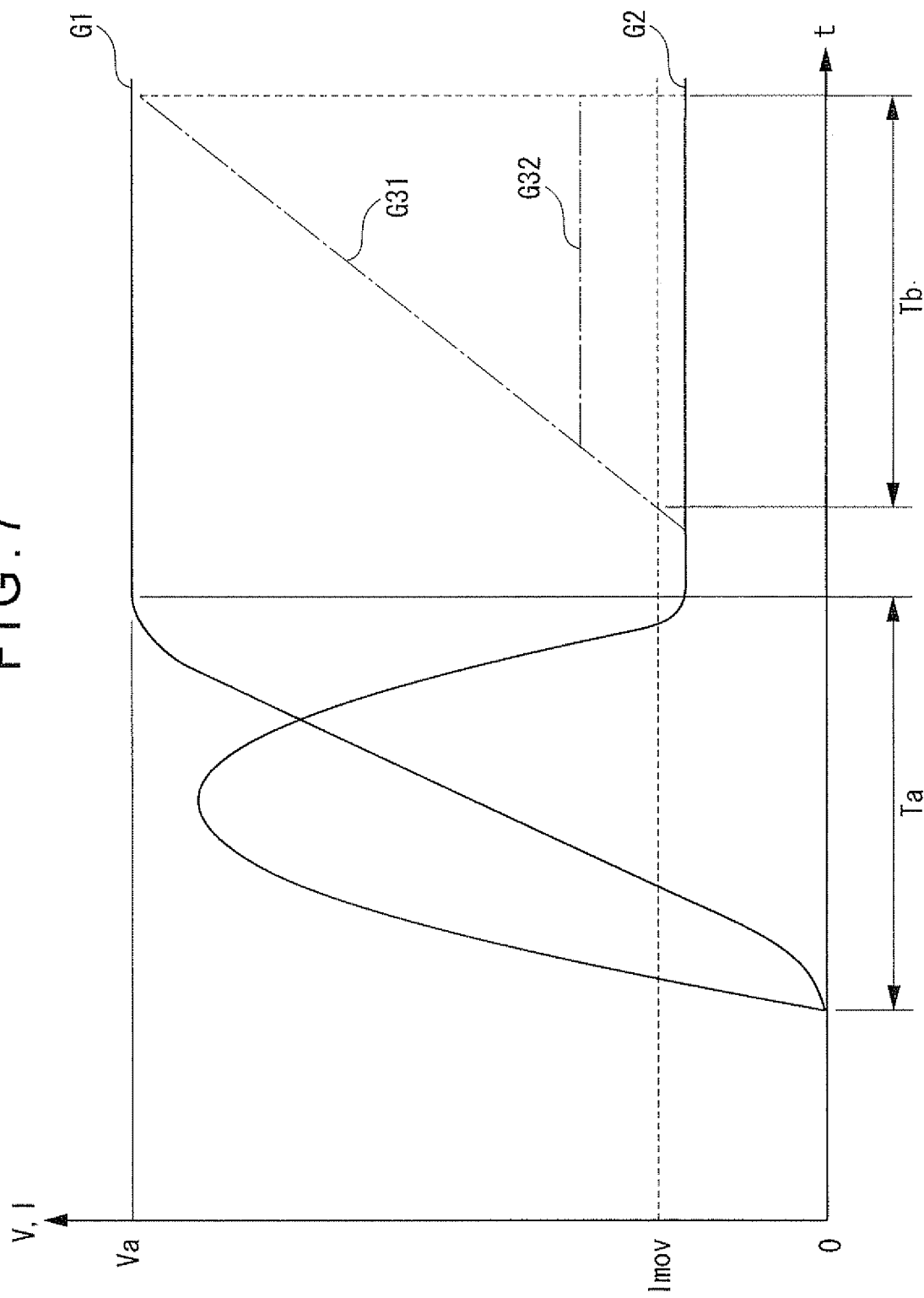
FIG. 7 is a graph showing a relationship between the threshold when the target speed is set at the maximum value, acceleration time, and a duration in the exemplary embodiment.

FIG. 7 is a graph showing a relationship between the threshold Imov when the target speed Va is set at the maximum value Vmov, the acceleration time Ta and the predetermined time Tb. In FIG. 7, the change in the current value I when the probe 21 collides with the workpiece 10 is exemplarily shown in graphs G31 and G32 in dashed lines.

As shown in the graphs G31 and G32 in FIG. 7, the load judging unit 34 outputs an error in the error output step S25 when the probe 21 collides with the workpiece 10 so that the current value I becomes greater than the threshold Imov and the duration exceeds the predetermined time Tb.

Then, when the error is outputted in the error output step S25, the motion controller 3 performs a predetermined processing (e.g. stopping the movement of the probe 21).

Incidentally, the predetermined time Tb is set at approximately the same length as the acceleration time Ta in this exemplary embodiment. Accordingly, since the duration for increasing the speed V for moving the probe 21 by the movement mechanism 22 is shorter than the predetermined time Tb, the load judging unit 34 resets the duration in the duration reset step S232. In other words, the load judging unit 34 does not output an error when the speed V for moving the probe 21 by the movement mechanism 22 is increased.

The above-described exemplary embodiment provides the following advantages.

(1) Since the target speed Va for moving the probe 21 by the movement mechanism 22 is in proportion to the threshold Ia set by the load judging unit 34, when the target speed Va for moving the probe 21 by the movement mechanism 22 is small, the load judging unit 34 set the threshold Ia at a small value; when the target speed Va is large, the load judging unit 34 set the threshold Ia at a large value. Accordingly, the coordinate measuring machine 1 can set the threshold Ia for judging the collision between the probe 21 or the slide mechanism 24 and the workpiece 10 at an appropriate level, so that the occurrence of the collision between the probe 21 or the slide mechanism 24 and the workpiece 10 can be rapidly judged.

(2) Since the load judging unit 34 judges the status of the load applied to the movement mechanism 22 based on the length of the duration, erroneous judgment of the status of the load applied on the movement mechanism can be avoided when, for instance, the speed V for moving the probe 21 by the movement mechanism 22 is increased.

Modification(s)

It should be understood that the scope of the present invention is not limited to the above-described exemplary embodiment(s) but includes modifications and improvements as long as an object of the invention can be achieved.

For instance, though the predetermined time Tb is set at approximately the same length as the acceleration time Ta in the above-described exemplary embodiment, the predetermined time Tb may be set at a different length.

Though the load judging unit 34 judges the status of the load applied to the movement mechanism 22 based on the length of the duration, the load judging unit 34 may not necessarily judge the status of the load applied to the movement mechanism 22 based on the length of the duration. In other words, it is only required for the load judging unit to judge the load applied on the movement mechanism based on the current value detected by the current value detecting unit and the threshold that is set in accordance with the target speed for moving the probe by the movement mechanism.

In the above-described exemplary embodiment, the speed for moving the probe 21 by the movement mechanism 22 in measuring the workpiece 10 by the probe 21 is defined as the minimum speed Vmes for moving the probe 21 by the movement mechanism 22, and the speed for moving the probe 21 without measuring the workpiece 10 is defined as the maximum speed Vmov for moving the probe 21 by the movement mechanism 22. However, the minimum speed and the maximum speed for moving the probe by the movement mechanism may not be set.

What is claimed is:

1. A coordinate measuring machine, comprising:
    a probe for measuring an object;
    a movement mechanism for moving the probe; and
    a controller for controlling the movement mechanism, the controller comprising:
    a current value detecting unit that detects a current value for moving the probe by the movement mechanism; and
    a load judging unit that judges a status of a load applied on the movement mechanism based on the current value detected by the current value detecting unit and a threshold that is set in accordance with a target speed for moving the probe by the movement mechanism, wherein
    the target speed is in continuous proportion to the threshold.

2. The coordinate measuring machine according to claim 1, wherein
    the load judging unit judges the status of the load applied on the movement mechanism based on a length of the time during which the current value detected by the current value detecting unit is kept larger than the threshold.

* * * * *